United States Patent
Zhou

(10) Patent No.: US 10,045,213 B2
(45) Date of Patent: Aug. 7, 2018

(54) METHOD AND APPARATUS FOR AUTHENTICATING TERMINAL IN MOBILE COMMUNICATIONS SYSTEM

(71) Applicant: BAICELLS TECHNOLOGIES CO. LTD., Haidian District, Beijing (CN)

(72) Inventor: Mingyu Zhou, Haidian District (CN)

(73) Assignee: Baicells Technologies Co. Ltd (CN)

( * ) Notice: Subject to any disclaimer, the term of this patent is extended or adjusted under 35 U.S.C. 154(b) by 0 days.

(21) Appl. No.: 15/414,112

(22) Filed: Jan. 24, 2017

(65) Prior Publication Data

US 2017/0134951 A1    May 11, 2017

Related U.S. Application Data

(63) Continuation of application No. PCT/CN2015/079303, filed on May 19, 2015.

(30) Foreign Application Priority Data

Jul. 28, 2014    (CN) .......................... 2014 1 0364824

(51) Int. Cl.
   *H04W 12/00* (2009.01)
   *H04W 12/06* (2009.01)
   *H04W 8/20* (2009.01)

(52) U.S. Cl.
   CPC ........... *H04W 12/06* (2013.01); *H04W 8/205* (2013.01)

(58) Field of Classification Search
   CPC .............................. H04W 12/06; H04W 8/205
   See application file for complete search history.

(56) References Cited

U.S. PATENT DOCUMENTS

| 7,231,203 B2* | 6/2007 | Marcelli ............. H04L 63/0869 455/410 |
| 8,370,509 B2* | 2/2013 | Faynberg ............ H04L 63/0815 709/203 |

(Continued)

FOREIGN PATENT DOCUMENTS

| CN | 101690287 | 3/2010 |
| CN | 102149170 A | 8/2011 |

(Continued)

OTHER PUBLICATIONS

International Search Report corresponding to PCT/CN2015/079303, dated Aug. 28, 2015, 4 pages.

(Continued)

*Primary Examiner* — Khai M Nguyen
(74) *Attorney, Agent, or Firm* — Calfee, Halter & Griswold LLP

(57) ABSTRACT

The present invention disclosed a method and an apparatus for authenticating a terminal in a mobile communication system, the method includes: an authenticating end obtains first authentication information sent by a terminal, the terminal is configured to obtain first certification information inputted by a user, and determine the first authentication information according to the first certification information, the first certification information is information certified by a target software; the authentication server authenticates the terminal according to the first authentication information; after the authentication server has successfully authenticate the terminal according to the first authentication information, a mobile communication authorize the terminal to access the mobile communication. The present invention solves the problem in the related art that the SIM card has restricted development of the terminal to be lighter and thinner.

14 Claims, 8 Drawing Sheets

(56) References Cited

U.S. PATENT DOCUMENTS

| | | | |
|---|---|---|---|
| 8,666,368 B2* | 3/2014 | Schell | H04L 63/062 370/328 |
| 2006/0240771 A1* | 10/2006 | Graves | G06Q 50/22 455/39 |
| 2011/0269423 A1 | 11/2011 | Schell et al. | |
| 2013/0267199 A1* | 10/2013 | Kamal | H04L 63/0853 455/410 |
| 2014/0130139 A1 | 5/2014 | Lee | |

FOREIGN PATENT DOCUMENTS

| | | |
|---|---|---|
| CN | 102264061 A | 11/2011 |
| CN | 103428696 | 12/2013 |
| CN | 103841560 | 6/2014 |
| CN | 104469765 | 3/2015 |
| CN | 104469766 | 3/2015 |
| EP | 2271146 A1 | 1/2011 |
| JP | 2002530976 A | 9/2002 |
| WO | 2012135793 A3 | 10/2012 |
| WO | 2013097177 A1 | 7/2013 |
| WO | 2013174185 A1 | 11/2013 |
| WO | 2014079022 A1 | 5/2014 |

OTHER PUBLICATIONS

Chinese Office Action for Chinese Patent Application No. 201410364824.7, dated Jun. 28, 2017, 10 pages.
European Search Report for European Patent Application No. 15826403.6 dated Feb. 9, 2018, 8 pages.
Japanese Office Action for Japanese Patent Application No. 2017-504088 dated Feb. 13, 2018, 9 pages.

* cited by examiner

# METHOD AND APPARATUS FOR AUTHENTICATING TERMINAL IN MOBILE COMMUNICATIONS SYSTEM

CROSS-REFERENCE TO RELATED APPLICATIONS

The present application is a continuation of International Patent Application No. PCT/CN2015/079303, filed on May 19, 2015, which claims priority to Chinese Patent Application No. 201410364824.7, filed on Jul. 28, 2014, the contents of both of which are incorporated herein by reference in their entireties.

TECHNICAL FIELD

The present invention relates to the field of communications and, particularly, relates to a method and an apparatus for authenticating a terminal in a mobile communication system.

BACKGROUND

At present, in the related art, a user needs to apply for a subscriber identity module (Subscriber Identity Module, SIM) card from a mobile communication service provider (such as China Mobile, China Unicom, China Telecom etc.), so as to obtain mobile communication service, and then pay for the communication service corresponding to the SIM card. Therefore, the mobile communication service (such as calling, texting, Internet surfing etc.) can be obtained as soon as the SIM card is inserted into a terminal. The mobile communication service provider charges according to the usage amount or resource occupied by the mobile communication of the user. The SIM card information can be used for authenticating the terminal to the mobile communication network.

With development of mobile broadband services and appearance of more and more smart terminals (such as smart phone), a user can enjoy smart services bought by mobile broadband services more sufficiently.

For example, at present, the smart phone is developing to be lighter and thinner. However in the related art, mobile communication based on SIM card needs a SIM card slot to be preset in a cellphone, which restricts the smart phone from being lighter and thinner.

In order to resolve the restriction of the SIM card on the lighter and thinner development of the smart phone, in the related art, Micro SIM card and Nano SIM card with sizes smaller than traditional SIM card are provided. However, the above-mentioned solution cannot solve the problem fundamentally.

Aiming at the problem in the related art that the SIM card has restricted the development of the terminal from being lighter and thinner, there is no effective solution proposed yet.

SUMMARY

The main objective of the present invention is to provide a method and an apparatus for authenticating a terminal in a mobile communication system, so as to solve the problem in the prior art that the SIM card has restricted the development of terminal from being lighter and thinner.

In order to achieve the above objective, according to an aspect of the present invention, a method for authenticating a terminal in a mobile communications system is provided.

The method includes: an authentication server obtains first authentication information sent by a terminal, the terminal is configured to obtain first certification information inputted by a user, and determine the first authentication information according to the first certification information, wherein, the first certification information is information certified by a target software; the authentication server authenticates the terminal according to the first authentication information; and after the authentication server has successfully authenticated the terminal according to the first authentication information, a mobile communication network authorizes the terminal to access the mobile communication network.

In order to achieve the above objective, according to another aspect of the present invention, an apparatus for authenticating a terminal in a mobile communications system is provided. The apparatus includes: a first obtaining unit, configured so that an authentication server obtains first authentication information sent by a terminal, the terminal is configured to obtain first certification information inputted by a user, and determine the first authentication information according to the first certification information, wherein, the first certification information is information certified by a target software; a first authenticating unit, configured so that the authentication server authenticates the terminal according to the first authentication information; and an authorizing unit, configured so that after the authentication server has successfully authenticated the terminal according to the first authentication information, a mobile communication network authorizes the terminal to access the mobile communication network.

In order to achieve the above objective, according to another aspect of the present invention, a storage medium is also provided, which is configured to store programming code executed by the method for authenticating a terminal in a mobile communication system.

The present invention adopts a terminal to obtain first certification information inputted by a user, the first certification information is the information certified by the target software; the terminal determines first authentication information according to first certification information; the terminal will send the first authentication information to the authentication server, the authentication server is configured to authenticate the terminal according to first authentication information; and after the authentication server has authenticated the terminal successfully according to first authentication information, the terminal accesses a mobile communication network, which solves the problem in the prior art that the SIM card has restricted the development of terminal from being lighter and thinner, so as to achieve the effect of facilitating the development of the terminal to be lighter and thinner.

BRIEF DESCRIPTION OF DRAWINGS

The drawings constituting a part of the present application are used to provide a further understanding of the present invention, the exemplary embodiments of the present invention and the descriptions thereof are used to explain the present invention, which will not constitute improper limitation to the present invention. In the drawings.

DESCRIPTION OF EMBODIMENTS

It should be noted that, embodiments in the present application and the features in embodiments can be combined with each other, unless when conflicting with each other. The present invention will be described in detail with reference to the drawings and the embodiments.

In order to make those skilled in the art further understand the present invention, the technical solutions in the embodiments of the present invention will be described clearly and completely combining the drawings in the embodiments of the present invention. Obviously, the described embodiments are only a part of the embodiments of the present invention, but not all of them. Based on the embodiments in the present invention, all other embodiments obtained by those skilled in the art without creative work shall belong to the protection scope of the present invention.

It should be noted that, the terms 'first', 'second' and so on in the specification, claims and above drawings of the present invention are used to distinguish between similar objects, which are not used to describe specific order or sequential order. It should be understood that these data can be exchanged with each other in proper situations, so that the embodiments of the present invention described here can be implemented in an order except for those illustrated or described here. Besides, the terms 'include', 'comprise', 'have' and any transformation thereof aim to cover non-exclusive including.

A method for authenticating a terminal in a mobile communication system is provided according to an embodiment of the present invention, the method for authenticating a terminal in a mobile communication system is used to authenticate identity of the terminal in the mobile communication system according to authentication information of target software. The method for authenticating a terminal in a mobile communication system can run on computer processing equipment.

Figure 1:
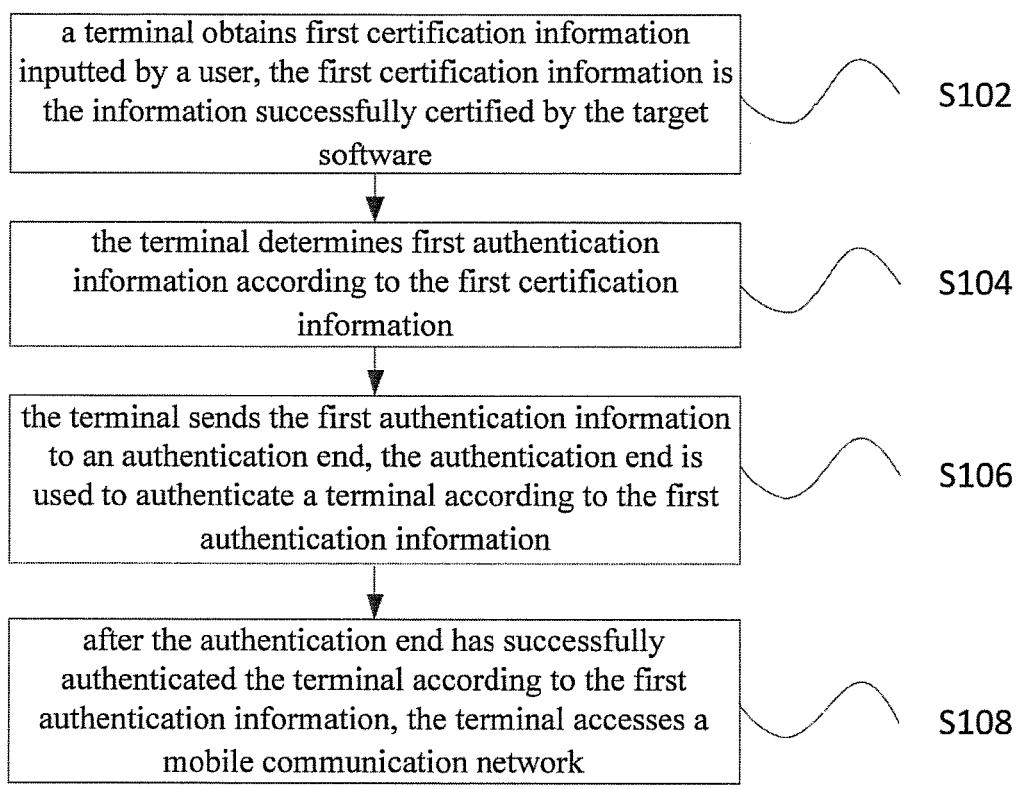
FIG. 1 is a flow chart of a method for authenticating a terminal in a mobile communication system according to an embodiment of the present invention.

FIG. 1 is a flow chart of a method for authenticating a terminal in a mobile communication system according to an embodiment of the present invention.

As shown in FIG. 1, the method includes the following steps S102-S108:

Step S102, a terminal obtains first certification information inputted by a user. The first certification information is the information successfully certified by the target software.

Step S104, the terminal determines first authentication information according to the first certification information.

Step S106, the terminal sends the first authentication information to an authentication server. The authentication server is used to authenticate a terminal according to the first authentication information.

Step S108, after the authentication server has successfully authenticated the terminal according to the first authentication information, the terminal accesses a mobile communication network.

Specifically, when entering an area covered by the mobile communication network, the terminal can automatically communicate with the mobile communication network and be authenticated with its identity according to the first certification information. After authentication, the authentication server can send the result of authentication to the mobile communication network. If the authentication is succeeded, the terminal can access the mobile communication network, and obtain the mobile communication service; if the authentication is failed, the terminal cannot access the mobile communication network, and thus cannot obtain the mobile communication service. Before the terminal sends the first authentication information to the authentication server, the mobile communication network can send an information authenticating request to the terminal, and then after receiving the information authenticating request, the terminal will send the first authentication information to the authentication server according to the information authenticating request.

It should be noted that, whether a terminal is entering an area covered by a mobile communication network can be based on detection of the terminal. For example, a base station periodically sends common reference signal (Common Reference Signal, CRS), the terminal will detect the intensity of the CRS (such as calculating reference signal received power (Reference Signal Received Power, RSRP) or reference signal received quality (Reference Signal Received Quality, RSRQ) according to the measurement of the CRS in long term evolution (Long Term Evolution, LIE) system), after the intensity of the CRS has reached a specific threshold, it is confirmed that the terminal has entered an area covered by a mobile communication network. For another example, a base station deployed by a specific operator periodically sends a signal carrying system relevant information (for example, information related to physical layer such as frequency bandwidth, base-station antenna number etc., public land mobile network (Public Land Mobile Network, PLMN), or relevant network information), the terminal will detect the signal, when detecting the information carried by the signals, it is confirmed that the terminal has entered the network coverage area of the operator.

The user only needs to input the certification information for once, the terminal will automatically communicate with the mobile communication network and be authenticated according to the first certification information as long as entering the area covered by the mobile communication network; as a preferred embodiment, after the user inputs the certification information to the terminal, the certification information will be stored in the terminal so as to facilitate subsequent authentication. Thus, when entering two non-overlapped mobile network areas at different time, the terminal will automatically communicate with the mobile communication network and be authenticated according to the certification information, which improves user experience.

It should be noted that, in practical application, in order to improve security, the terminal can also remind the user to input the certification information according to a preset condition. For example, when the terminal is restarted, or flight mode thereof is switched from open status to close status, the terminal can remind the user to input the certification information. It should be noted that, in such situations, it is still unnecessary for the user to input the certification information again when entering a new network coverage area.

It should be noted that, the terminal not only includes mobile phone or cellphone, but also can include other devices which can send and receive wireless signals. For example, the terminal can be smart household appliance, or can be other devices which can initiatively communicate with the mobile communication network without manual operation.

The first authentication information can be used to authenticate a terminal in target software developed by a third-party except the user and the mobile communication service provider. For example, the target software can be 'Wechat' software or 'QQ' software developed by Tencent Company, or 'Michat' software developed by Xiaomi Company and so on. The user can input the first certification information to the terminal by many manners, for example, the user can the input the first certification information through the manner of typing on physical keyboard or virtual keyboard at the terminal or through the manner of scanning.

Figure 2:
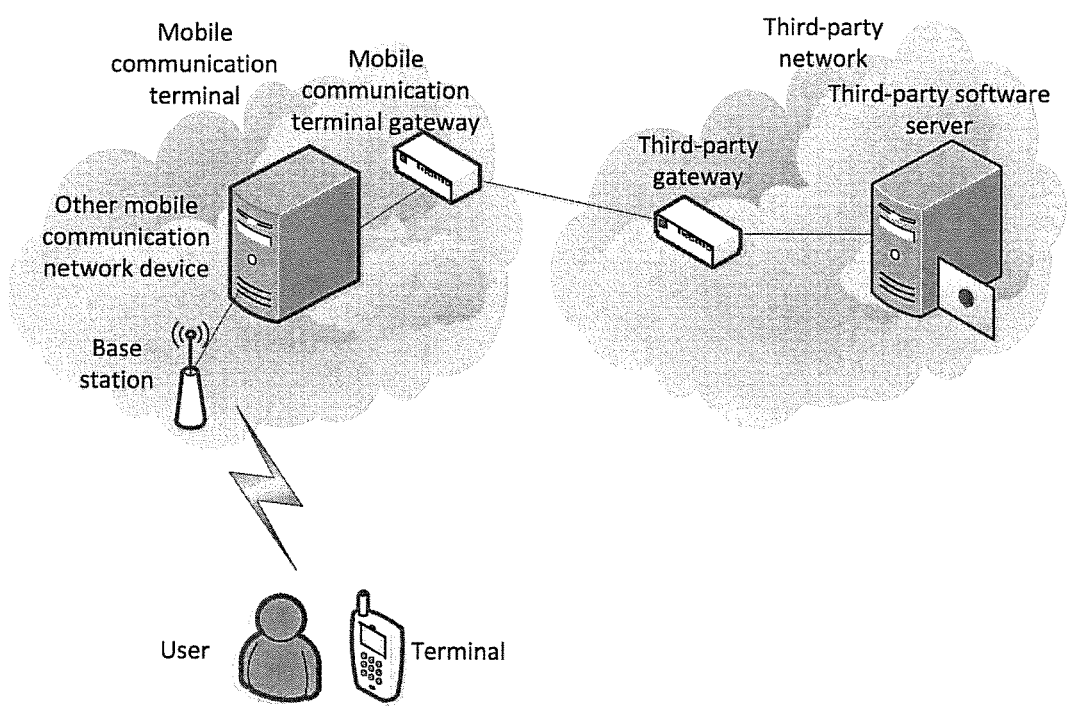
FIG. 2 is a schematic diagram of a system for authenticating a terminal in a mobile communication system according to an embodiment of the present invention.

The mobile communication network and network in which the third-party target software is located are different networks, the gateway controls data transmission between the two networks, so as to guarantee the security of their own information. As shown in FIG. 2, the terminal communicates with the base station in the mobile communication network, the base station is connected to a third-party network through the gateway in the mobile communication network, the third-party network includes a third-party software server and a third-party gateway.

As a preferred embodiment, the first authentication information can be a username or a password of the target software, or the combination thereof. For example, the first certification information can be an identity (Identity, ID) of WeChat, or an ID and password of WeChat, or an ID of Michat, or an ID and a password of Michat. Various forms of the username and the password can be included, which are not limited here. For example, which can be information of biological characteristics (such as fingerprint information, retina information, palm-print information, iris information, facial feature information, voice feature information, signature feature information, Deoxyribonucleic acid (Deoxyribonucleic acid, DNA) information) etc.; and can be certificate information; and also can be sound, audio, sign, line and so on. It should be noted that, the first certification information can be any combination of the above information forms, for example, the user can input facial feature information while inputting fingerprint information, or input voice information after inputting fingerprint information.

It should be noted that, as the information certified by the target software, the first certification information can authenticate the target software and obtain service. For example, user can use client software of Tencent QQ on a personal computer (Personal Computer, PC) by using the first certification information.

In the embodiment of the present invention, through taking the biological characteristic information such as fingerprint, retina, voice etc. as the certification information, so that the user can communicate free from the constraint of SIM card. Moreover, the certification information of the software designed by a third-party is taken as the authentication basis for the terminal to access the mobile communication network. Therefore, it is unnecessary to arrange a SIM slot in the terminal, and it is unnecessary to insert a SIM card, which avoids the limitation bought by a SIM card with a big size on the development of a terminal, and is advantage for the design of a terminal to be lighter and thinner. In addition, the certification information of software designed by a third-party is used to authenticate a mobile communication network, so that the software designed by a third-party can be an access of the mobile communication network, which is advantage for development and innovation of the mobile internet.

As a preferred embodiment, in an embodiment of the present invention, the terminal can include one or more terminals, for example, the terminal can include a first terminal and a second terminal, thus, when the user inputs the same certification information on the first terminal and the second terminal respectively, for example, after the second terminal is authenticated successfully according to the certification information, if the first terminal also uses the same certification information, then the first terminal and the second terminal can be authenticated through Manner One or Manner Two:

Manner One:

S2, a first terminal obtains first certification information inputted by a user.

S4, the first terminal determines first authentication information according to the first certification information.

S6, the first terminal sends the first authentication information to an authentication server.

S8, the authentication server receives the first authentication information sent by the first terminal.

S10, the authentication server authenticates the first terminal according to the first authentication information sent by the first terminal.

S12, the authentication server judges whether the second terminal has been authenticated successfully according to the first authentication information sent by the first terminal.

S14, if the authentication server judges that the second terminal has been authenticated successfully according to the first authentication information sent by the first terminal, the mobile communication network disconnects the connection between the second terminal and the mobile communication network.

S16, after the authentication server successfully authenticates the first terminal according to the first authentication information sent by the first terminal, the first terminal accesses the mobile communication network.

In Manner One, after the first terminal is authenticated successfully by the mobile communication network, the second terminal cannot keep communicating with the mobile communication network. That is, if the second terminal is authenticated successfully in the mobile communication network through certain certification information firstly, subsequently, the mobile communication network detects that the certification information is also used to authenticate the first terminal, then after the first terminal is authenticated successfully, the mobile communication authorizes the first terminal to communicate with the mobile communication network, and disconnects the communication between the second terminal and the mobile communication network.

As a preferred embodiment, after the second terminal has communicated with the mobile communication network, the user information stored in the second terminal can be deleted automatically, or be deleted by the first terminal remotely. The user information can include at least one of the following information: message, call record, address book, picture, email, memo, data and so on stored on application software by the user.

As a preferred embodiment, based on Manner One, before S14 'the second terminal disconnects the connection with the mobile communication network', the following steps also can be executed:

S18, the authentication server judges whether the network access priority of the first terminal is higher than the network access priority of the second terminal.

S20, if the authentication server judges that the network access priority of the first terminal is higher than the network access priority of the second terminal, the second terminal disconnects the connection with the mobile communication network.

S22, if the authentication server judges that the network access priority of the first terminal is lower than the network access priority of the second terminal, then the authentication server does not authenticate the first terminal according to the disconnection instruction sent by the second terminal.

The priority can be judged according to: the mobile communication network can send a respond request to the first terminal and the second terminal, and authorize the higher priority to the terminal responding at first.

Manner Two:

S24, a first terminal obtains first certification information inputted by a user.

S26, the first terminal determines first authentication information according to the first certification information.

S28, the first terminal sends the first authentication information to an authentication server.

S30, the authentication server receives the first authentication information sent by the first terminal.

S32, the authentication server authenticates the first terminal according to the first authentication information sent by the first terminal.

S34, the authentication server judges whether the second terminal has been authenticated successfully according to the first authentication information sent by the first terminal.

S36, if the authentication server judges that the second terminal has been authenticated successfully according to the first authentication information sent by the first terminal, then the second terminal keeps the connection with the mobile communication network.

S38, after the authentication server successfully authenticates the first terminal according to first authentication information sent by the first terminal, the first terminal accesses the mobile communication network.

S40, the first terminal obtains a first type of mobile communication service provided by the mobile communication network.

S42, the second terminal obtains a second type of mobile communication service provided by the mobile communication network.

In Manner Two, the first terminal and the second terminal can keep communicating with the mobile communication network at the same time. It should be noted that, in Manner Two, the mobile communication network can send a message to both terminals so as to prompt that another terminal is using the same certification information for authentication at the same time.

It should be noted that, the first type of mobile communication service can be different from the second type of mobile communication service. The service categories of the first type of mobile communication service can be broader than the service categories of the second type of mobile communication service. For example, the first type of mobile communication service may include services of circuit switch (Circuit Switch, CS) domain and packet switch (Packet Switch, PS) domain, the second type of mobile communication service may only include the service of the PS domain or CS domain. The service of the CS domain can be voice communication, which can avoid multiple terminals from being able to answer when someone else is paging the certification information. Or the first terminal can use the service such as voice, video or data transmission etc. through the mobile communication network, but the second terminal can only use voice service through the mobile communication network.

It should be noted that, the first terminal has a function of viewing the geographical location of the second terminal, but the second terminal does not have the function of viewing the geographical location of the first terminal. Furthermore, the first terminal has a function of controlling the security of the second terminal, but the second terminal does not have the function of controlling the security of the first terminal, for example, the first terminal can authorize the second terminal with the function of accessing the information corresponding to the certification information.

Figure 3:
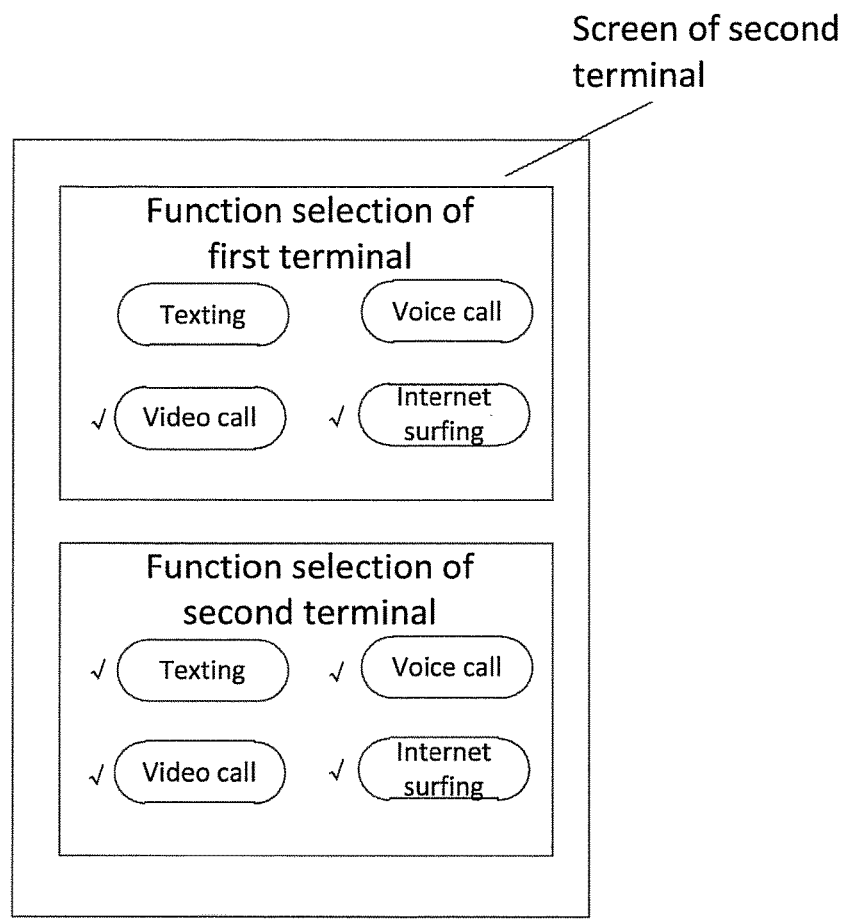
FIG. 3 is a schematic diagram of an interface for setting functions of terminal according to an embodiment of the present invention.

As a preferred embodiment, the user can choose communication function and service on a terminal for the first terminal and the second terminal, and can set on the setting interface of the terminal, or can login application software or a webpage of the mobile communication service provider for setting. For example, on the second terminal, the user can open/close different categories of services for the first terminal and the second terminal, as shown in FIG. 3, '√' represents opening the corresponding service.

As a preferred embodiment, the mobile communication network can charge the mobile communication service according to the certification information. When multiple terminals are using the same certification information for authentication at different time periods, the mobile communication network can charge a same certification used in all the mobile communication services for multiple terminals. For example, the second terminal downloads content of 100 M bit in a first time period, the first terminal downloads content of 200 M bit at a second time period, then the mobile communication network charges the traffic of 300 M bit of the certification at the two time periods. Thus, user experience can be improved.

Report for loss not needed: if a user's terminal (such as cellphone) is lost, it is unnecessary to get another SIM card, the user can keep obtaining the mobile communication service as long as inputting the certification information in another terminal.

Smart guard against theft: if a user's cellphone is stolen, the user can input his certification information in another terminal, and check the geographical location of the terminal using the same certification information, so as to locate the stolen cellphone, and delete the certification information in the stolen cellphone in remote, so as to avoid information leakage.

Traffic share: the same certification information can be inputted into multiple terminals at the same time, so as to share the traffic corresponding to the same certification information.

Certification secured: when the first terminal obtains the mobile communication service by using the certification information, if the network detects that the second terminal also accesses the network by using the same certification information, then sends a message to inform the first terminal, so as to remind the user of the first terminal to notice the security of the certification information.

Convenient communication: as long as there is a terminal, it could conveniently access the mobile communication network to share the mobile communication service by using the above certification information. For example, when there is a need to communicate, the user can access the mobile communication network only by pressing using a finger on a public communication terminal, which is unnecessary to bring a cellphone everywhere; the public communication terminal can only support service of CS voice call, which will not leak much personal information, so as to be advantage for the user to get rid of bonding of the terminal. For another example, when a first user uses a second user's terminal for communication, the first user can access the mobile communication network through retina information, the mobile communication network will charge the retina certification information, thus, the second user will not have a problem on charges, which is advantage for terminal share.

For another example, the user can carry a small screen terminal, when there is a need on video communication, the user can borrow a public large screen terminal, and access the mobile communication network through the facial recognition information, the mobile communication network will charge the certification information corresponding to the facial recognition information for the traffic on the large screen, after the large screen communication is over, the same facial recognition information is used again to authenticate the small screen terminal, thus, the personal information saved in the large screen terminal will be deleted automatically.

The terminal can take certification information inputted by a user as authentication information directly, and can send the all or a part of the authentication information to the mobile communication network, the terminal can also process the certification information firstly, obtain the authentication information, and then send the all or a part of the authentication information to the mobile communication network, for example, the terminal can encrypt the certification information.

Specifically, in the embodiment of the present invention, the terminal can determine the first authentication information according to the first certification information through various manners:

Example 1

Firstly, the terminal determines identification data according to the first certification information.

Secondly, the terminal generates the first authentication information according to the identification data.

Figure 4:
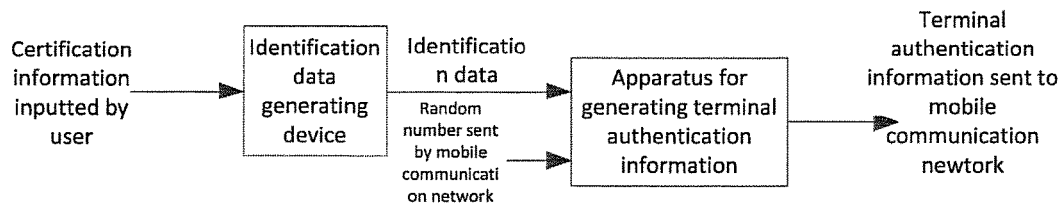
FIG. 4 is a schematic diagram showing a generating process of authentication information according to an embodiment of the present invention.

Specifically, the terminal side can include an apparatus for generating identification data, the apparatus for generating identification data is used to generate corresponding identification data according to the first certification information inputted by the user, the identification data is used to generate the authentication information through the apparatus for generating authentication information of terminal, as shown in FIG. 4.

Due to the irregular format of the certification information which can be used to authenticate the target software designed by a third-party, for example, the certification information can be an email address, a string of numeric characters etc., however, in communication authentication, the identification data needs to have a fixed format, for example, key Ki code stored in traditional SIM card is a code with a fixed length (such as a binary code of which the length is 64 or 128, an international mobile subscriber identification number (International Mobile Subscriber Identification Number, IMSI) which can include numbers from 0 to 9 with a length of no more than 15). Therefore, any certification information can be transformed to the identification data with a uniform format through Example 1. For example, the apparatus for generating identification data can transform the certification information inputted by the user to the code having the same format with that of the Ki code.

Besides, since the authentication information of the user needs to be transmitted over the network, therefore there may be security problems. However, in an embodiment of the present invention, since the 'apparatus for generating identification data' is adopted, the network only needs to transfer the authentication information generated according to the identification data, but cannot obtain the certification information inputted by the user, such as biological characteristic information of the user, which avoids leakage of the biological characteristic information of the user, so as to eliminate user's worry.

As a preferred embodiment, the apparatus for generating identification data can generate the identification data immediately according to the current certification information, or can pre-store one or more pieces of identification data in the terminal, when the user is inputting certification information, the terminal can search the corresponding identification data according to the first certification information, and send the authentication information generated from the searched identification data to the mobile communication network. When the certification information inputted by the user cannot be matched to one or more pieces of certification information pre-stored, the terminal will not generate authentication information. A terminal can store identification data of multiple pieces of the certification information, which is convenient for the terminal to switch between certification information flexibly. For example, a terminal can store multiple pieces of identification data of family members, which is convenient for family members to exchange terminal.

The identification data stored in a terminal can be stored in the terminal by the manner of being inputted by a user or downloading. For example, a user manually inputs identification data corresponding to the certification information; or after a user inputs certification information in an environment with WIFI connection, the terminal automatically downloads the identification data corresponding to the certification information; or a user can download the identification data to the terminal through the manner of near field communication (Near Field Communication, NFC). Specifically, the identification data can be downloaded to an identification data apparatus, and then the terminal reads the identification data from the identification data apparatus through the NFC. It should be noted that, the operation can only be executed once.

As a preferred embodiment, the apparatus for generating identification data can be chosen according to the certification information inputted by a user and a preset function, the certification information of different types correspond to different functions. For example, if the format of the certification information inputted by a user is email address, then a first function is adopted; if the format of the certification information inputted by a user is a string of numbers, then a second function is adopted . . . . Or the corresponding function can be set according to the target software corresponding to the certification information, for example, if the certification information is a Wechat ID, then corresponding to the first function, if the certification information is a Michat ID, then corresponding to the second function. In this way, any certification information can be generated into identification data of the same format through controlling correspondence between different functions and the certification information of different types, which will not cause data conflict. For example, identification data corresponding to any Wechat ID will not conflict with identification data corresponding to any Michat ID, thus, the uniqueness of the identity of the certification information can be guaranteed. The different functions above can be pre-stored in a terminal, which also can be downloaded in a terminal in real time.

Example 2

Firstly, the terminal receives an authentication request including a random number which is sent by the authentication server.

The step can be executed before the step S102 above.

Secondly, the terminal determines the first authentication information according to first certification information and the random number.

Figure 5:
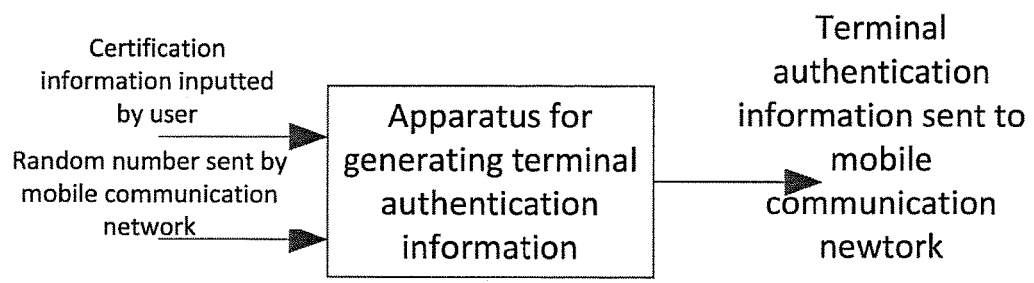
FIG. 5 is a schematic diagram showing another generation process of authentication information according to an embodiment of the present invention.

For security of network transmission, the authentication information request sent to the terminal by the mobile communication network can include a random number, the terminal can determine the authentication information by the random number and the first certification information inputted by a user using the first authentication function, and send the authentication information to the mobile communication network, as shown in FIG. 5, the first authentication function is realized in the apparatus for generating authentication information of terminal. The mobile communication network side has the information of the random number and the first authentication function, and then receives the authentication information of the terminal, then can authenticate the terminal accordingly. Thus, even though the authentication information sent by a terminal is intercepted by someone else, since the interceptor does not know the random number which is only used to authenticate for this time, so he cannot reversely obtain the certification information inputted by the user, so as to guarantee the security of the certification information.

As a preferred embodiment, in an embodiment of the present invention, except for the above-mentioned certification information (that is, the first certification information) used to authenticate the user's terminal, there is another type of certification information (such as a second certification information) that can be used to authenticate the user's terminal combining with the first certification information. For example, before being authenticated according to the first certification information, the terminal can be preliminarily authenticated through the second certification information. Specifically, before the above-mentioned Step S102 'a terminal obtains first certification information inputted by a user', the following steps can be executed:

S44, the terminal obtains the second certification information through a subscriber identity module SIM connected with the terminal. And/or S46, the terminal obtains the second certification information through a storage module embedded therein.

S48, the terminal determines the second authentication information according to the second certification information.

S50, the terminal sends the second authentication information to an authentication server. At this time, the authentication server can be used to authenticate the terminal according to the second authentication information.

S52, after the authentication server has successfully authenticated the terminal according to the second authentication information, the terminal accesses the mobile communication network so as to obtain a third type of mobile communication service.

S54, after the authentication server has successfully authenticated the terminal according to the first authentication information, the terminal accesses the mobile communication network so as to obtain a fourth type of mobile communication service.

As a preferred embodiment, in an embodiment of the present invention, the terminal can access the mobile communication network through a local Internet protocol (Internet Protocol, IP) Access (Local IP Access, LIPA) protocol so as to obtain the third mobile communication service. The terminal can access the mobile communication network through a selected IP traffic offload (Selected IP Traffic Offload, SIPTO) protocol so as to obtain the fourth mobile communication service.

The terminal can directly access other device which has IP capacity in an area covered by a base station through the LIPA protocol, for a home evolved node B (Home evolved Node B, HeNB), the terminal can directly access other device having IP capacity in a family network or an enterprise network, so that it is unnecessary to transfer through core network, which is advantage for releasing load of the core network.

Through the SIPTO protocol, the Internet can be directly accessed through the HeNB or a macro base station, which is also advantage for releasing load of the core network. Different from the LIPA, the terminal can visit other networks except local network through the SIPTO protocol.

Figure 6:
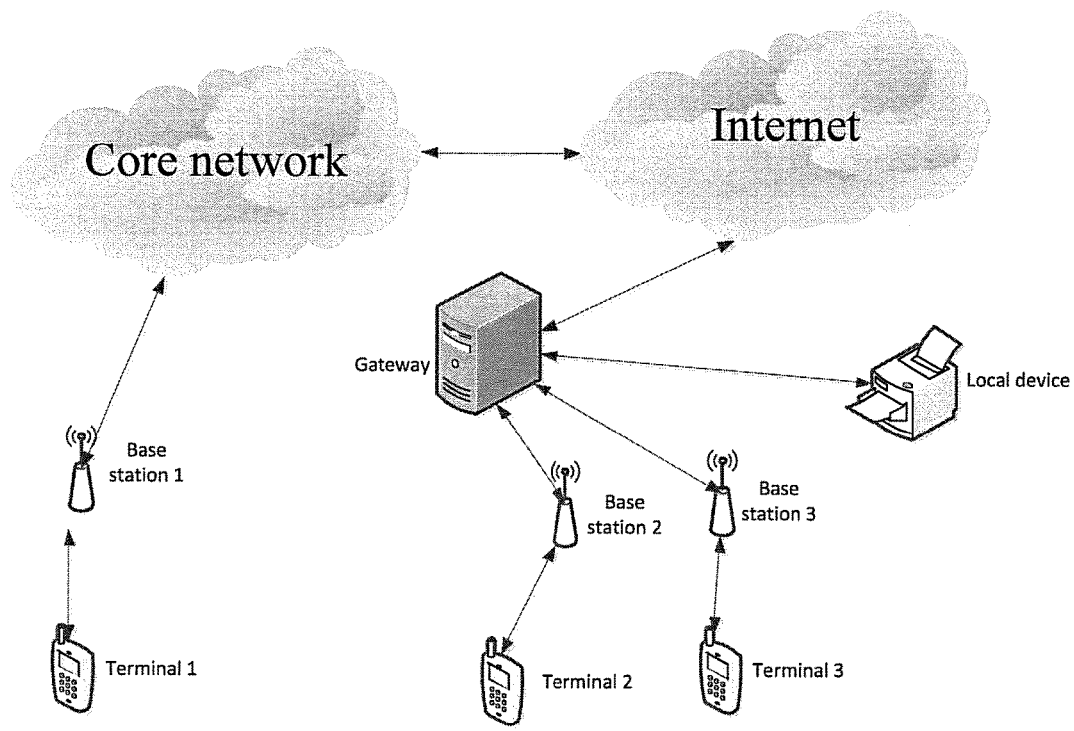
FIG. 6 is a schematic diagram of authenticating a terminal according to an embodiment of the present invention.

As shown in FIG. 6, the communication between the 'terminal 1' and the Internet is the traditional communication through the core network; the communication between the 'terminal 2' and the Internet is the communication through the SIPTO protocol; the communication between the 'terminal 3' and the local device is the communication through the LIPA protocol.

As a preferred embodiment, in an embodiment of the present invention, when the terminal is accessing a mobile communication network and obtaining different types of mobile communication service according to different certification information, the terminal can generate corresponding reminding information to remind the user the current available mobile communication service. For example, after 'the terminal accesses a mobile communication network to obtain a third type of mobile communication service', the terminal can generate first reminding information; after 'the terminal accesses a mobile communication network to obtain a fourth type of mobile communication service', the terminal can generate a second reminding information. The first reminding information can be different from the second reminding information.

The second certification information can be SIM card information, when the terminal is successfully authenticated according to the SIM card information, the terminal sends the first reminding information; when successfully authenticated according to the first certification information, the terminal sends the second reminding information, so that it is convenient for the user to obtain the current available mobile communication service types.

For example, if the user does not input first certification information in a terminal, the user can only use the third mobile communication service when the terminal enters into an area covered by the mobile communication network, at this time, the terminal will send the first reminding information. For example, the cellphone is showing 'welcome to the area covered by xx mobile, you can obtain xx service'. If the terminal does not send the second reminding information, the user can find out the service situation of himself. Thus, when expecting to obtain the fourth type of mobile communication service, the user can apply through paying. After successfully applied, the terminal will send the second reminding information, for example, the cellphone is showing 'you are an advanced user of xx mobile, the free network traffic left is xx', or the application (Application, APP) on the cellphone is colored from gray.

It should be noted that, in practical application, the method provided by the present invention is not limited to a combination with the communication method of a traditional SIM card, for example, the terminal used in the present invention can include a traditional SIM card slot so as to insert a traditional SIM card for the user, and also can obtain the first certification information inputted by the user. The terminal can pass through the authentication of the traditional mobile communication network according to a traditional SIM card, and can also use the method of the present invention to pass through the authentication of the new type mobile communication network.

The third mobile communication service can be at least one of the followings: accessing cache of the local base station, watching ads, obtaining information of nearby geographic area, paying for obtaining the fourth type of the mobile communication service, accessing websites of a part of enterprises. Thus, any eligible user (no matter payed or not) who has joined a mobile communication network can enjoy the third type of mobile communication service as long as entering an area covered by a mobile communication network, so as to be able to absorb more users to join the mobile communication network, and bring advertising interest to the mobile communication service provider, at the same time, bring more conveniences to the users, for example, when a user is entering a mall, he can obtain all the queueing conditions of all restaurants, so as to avoid from asking each restaurant whether he can have dinner right now, which improves user's experience. However, when any user who accesses the mobile communication network can pay for obtaining the fourth type of mobile communication service, which can reduce the limitation of user payment, and is convenient for the users to pay through self-service. When any eligible user who has joined the mobile communication network can access websites of a part of enterprises, which can be helpful for the mobile communication service providers to help the enterprises to promote business, which is also helpful to increase the value of the mobile communication service provider to the enterprises.

According to an embodiment of the present invention, another method for authenticating a terminal in a mobile communication system is provided.

Figure 7:
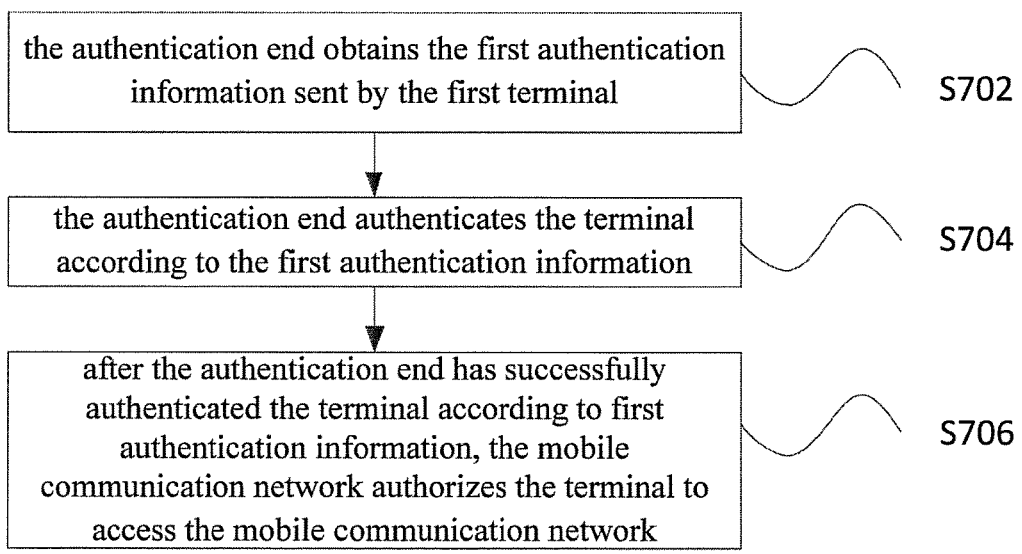
FIG. 7 is a flow chart of another method for authenticating a terminal in a mobile communication system according to an embodiment of the present invention.

FIG. 7 is a flow chart of another method for authenticating a terminal in a mobile communication system according to an embodiment of the present invention.

As shown in FIG. 7, the method includes the following steps S702-S706:

Step S702, the authentication server obtains the first authentication information sent by the first terminal. The terminal can be used to obtain the first authentication information inputted by the user, and determine the first authentication information according to the first certification information, the first certification information is the information successfully certified by the target software.

Step S704, the authentication server authenticates the terminal according to the first authentication information.

Step S706, after the authentication server has successfully authenticated the terminal according to first authentication information, the mobile communication network authorizes the terminal to access the mobile communication network.

The authentication server receives the first authentication information sent by the terminal according to the first certification information inputted by the user, and authenticates the terminal according to the first authentication information, if authentication is succeeded, the mobile communication network will provide mobile communication service to the terminal. The first certification information can be used to authenticate the user in software (target software) developed by a third-party except the user and the mobile communication service provider.

It should be noted that, the above operations can be executed by different mobile communication networks, for example, the base station can be used to receive the authentication information, and provide mobile communication service for the terminal, the subscriber authentication center is used to authenticate the terminal; the above-mentioned operations also can be executed by a same mobile communication network, for example, the base station can be used to communicate, authenticate, receive and send signals.

As a preferred embodiment, in an embodiment of the present invention, the authentication server can be the subscriber authentication center in the mobile communication network, or can be a mobile communication server (such as an authentication, authorization, accounting (Authentication, Authorization, Accounting, AAA) server) in the mobile communication network, or can be a cloud platform having the functions of an authentication server in the mobile communication network. Or the authentication server can also be a software server (short for third-party software hereinafter) corresponding to the target software developed by a third-party. The subscriber authentication center, the mobile communication server and the software server can respectively authenticate a terminal through the following manners:

Subscriber Authentication Center:

S56, the subscriber authentication center obtains user data used for target software to certify the first certification information.

S58, the subscriber authentication center receives the first authentication information sent by the terminal.

S60, the subscriber authentication center authenticates the terminal according to the user data and the first authentication information.

S62, after the subscriber authentication center has successfully authenticated the terminal according to the first authentication information and the user data, the authentication server authorizes the terminal to access the mobile communication network.

Mobile Communication Server:

The authentication manner of the mobile communication server is similar to the subscriber authentication center, which will not be repeated here.

Since the subscriber authentication center, the mobile communication server (such as the AAA server) and the cloud platform all authenticate inside the mobile communication network, it is unnecessary to repeatedly forward to a third-party software server to accomplish the authentication, the authentication process is fast, which helps to improve user experience. Particularly, the third-party software server uses the first key to encrypt the user data, and then sends to the mobile communication network. Thus, because the mobile communication service provider does not know the first key, then cannot reversely obtain the user data information hold by the third-party software server, so as to protect the security of the user data hold by a third-party.

The first certification information sent to the mobile communication network by the terminal can also be encrypted using the first key, thus, the mobile communication network device can complete the authentication process as long as judging whether the certification information sent by the user matches the encrypted user data sent by the third-party software server; in this situation, the involved software that the user inputs the certification information on the terminal is also developed by a third-party (such as the Tencent), for example, the user inputs username and password in a cellphone through the Wechat APP developed by the Tencent, the APP automatically encrypts the username and the password by using the first key, then sends to the mobile communication network device, the mobile communication network device can authenticate the terminal using the encrypted information directly.

The certification information sent to the mobile communication network by the terminal can also be encrypted using the second key which is different from the first key, so as to have a higher security. For example, the authentication algorithm adopted by the mobile communication network is related to the first key and the second key, so as to achieve authentication, since the mobile communication network does not know the first key and the second key, then cannot obtain the user data. Certification information of different third-parties uses different keys, which is able to achieve a higher security. For example, Wechat and Michat use different keys.

Figure 8:
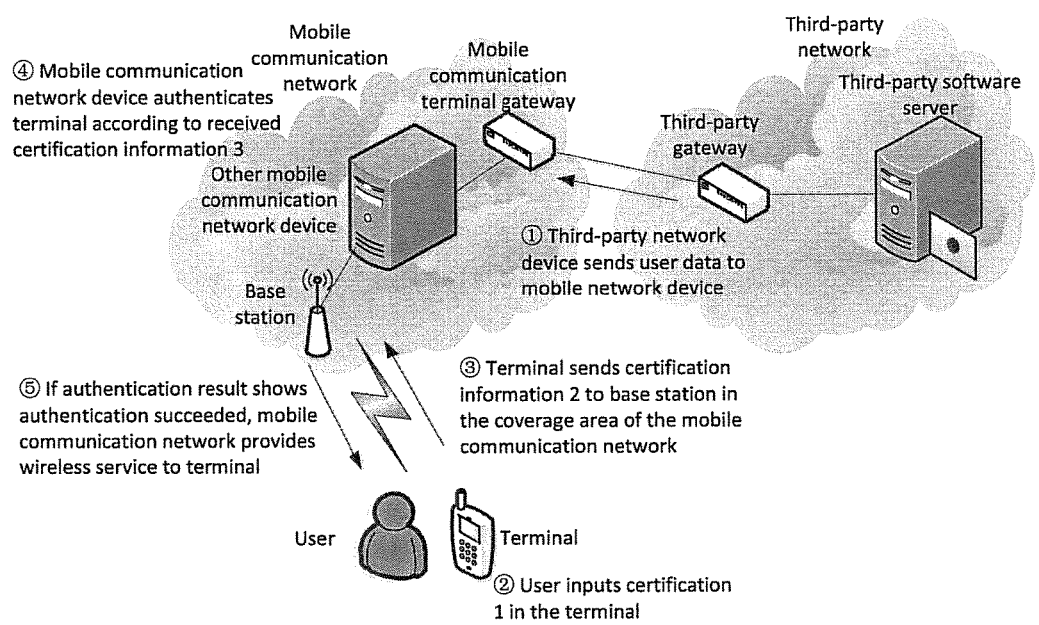
FIG. 8 is a schematic diagram showing an authenticating process by a mobile communication server to a terminal according to an embodiment of the present invention.

In an embodiment of the present invention, the authentication process of the mobile communication service on a terminal can specifically include: firstly, the mobile communication network obtains user data from a third-party, for example, obtaining the user data with respect to the username and the password, next, the user inputs the username and the password in the terminal, when the terminal enters an area covered by the mobile communication network, the terminal will automatically send the certification information to the mobile communication network according to the username and the password inputted by the user, the mobile communication network authenticates the terminal according to the user data obtained from the third-party and the authentication information obtained from the terminal, and provides the mobile communication service to the terminal according to the authentication result. The whole process is shown in FIG. 8, the authentication process is completed according to the sequence numbers.

Software Server:

Firstly, the software server obtains the first authentication information sent by the first terminal.

Secondly, the software server authenticates the terminal according to the first authentication information.

Thirdly, after the software server has successfully authenticated the terminal according to first authentication information, the mobile communication network authorizes the terminal to access the mobile communication network.

When the authentication of the terminal is completed on a third-party software server, the third-party software server sends the authentication result to the mobile communication network, the mobile communication network provides the mobile communication service to the terminal according to the authentication result.

Figure 9:
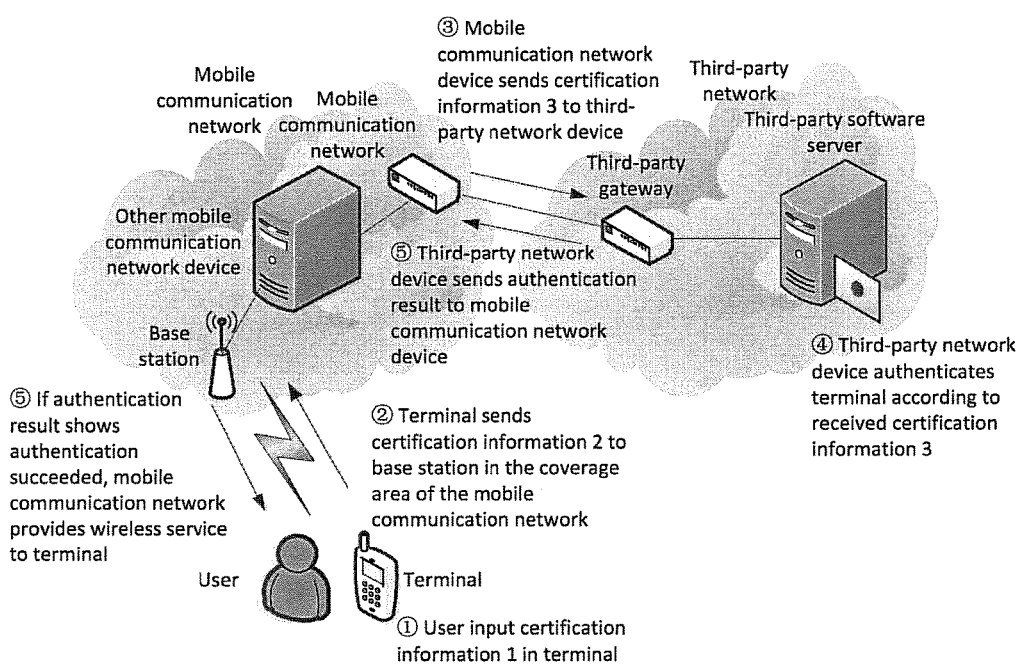
FIG. 9 is a schematic diagram showing an authenticating process by a third-party software server to a terminal according to an embodiment of the present invention.

Specifically, after the terminal sends the authentication information to the mobile communication network, the mobile communication network will send the authentication information to the third-party network device (such as third-party software server) directly or after processed, finally, the third-party software server will authenticate the terminal (authenticating according to the user data reserved when the user is registered as a third-party software user before the process); if the authentication is succeeded, then notifying the mobile communication network, the mobile communication network will provide the mobile communication service to the terminal. The whole process is shown in FIG. 9, the authentication process is completed according to the sequence numbers.

Certification information 1, certification information 2, certification information 3 can be the same or different. For example, different encryptions are used in different processes and so on, the second certification information is generated from the first certification information, and the third certification information is generated from the second certification information.

As a preferred embodiment, in an embodiment of the present invention, the terminal can include multiple terminals, for example, the terminal can include a first terminal and a second terminal, thus, the authentication server can authenticate the first terminal and the second terminal through Manner One or Manner Two.

Manner One:

S64, the authentication server obtains the first authentication information sent by the first terminal.

S66, the authentication server authenticates the first terminal according to the first authentication information sent by the first terminal.

S68, the authentication server judges whether the second terminal has been successfully authenticated according to the first authentication information sent by the first terminal.

S70, if the authentication server judges that the second terminal has been successfully authenticated according to the first authentication information sent by the first terminal, then the second terminal disconnects with the mobile communication network.

S72, after the authentication server has successfully authenticated the first terminal according to the first authentication information sent by the first terminal, the authentication server authorizes the first terminal to access the mobile communication network.

As a preferred embodiment, in an embodiment of the present invention, before 'the second terminal disconnects with the mobile communication network', the following steps also can be included:

S74, the authentication server judges whether the network access priority of the first terminal is higher than the network access priority of the second terminal, S76, if the authentication server judges that the network access priority of the first terminal is higher than the network access priority of the second terminal, then the second terminal disconnects with the mobile communication network.

S78, if the authentication server judges that the network access priority of the first terminal is lower than the network access priority of the second terminal, then the authentication server does not authenticate the first terminal according to the first certification information sent by the first terminal.

Manner Two:

S80, the authentication server receives the first authentication information sent by the first terminal.

S82, the authentication server authenticates the first terminal according to the first authentication information sent by the first terminal.

S84, the authentication server judges whether the second terminal has been successfully authenticated according to the first authentication information sent by the first terminal.

S86, if the authentication server judges that the second terminal has been successfully authenticated according to the first authentication information sent by the first terminal, then the second terminal keeps the connection with the mobile communication network.

S88, after the authentication server has successfully authenticated the first terminal according to first authentication information sent by the first terminal, the mobile communication network authorizes the first terminal to access the mobile communication network.

The first terminal can obtain a first type of mobile communication service provided by the mobile communication network. The second terminal can obtain a second type of mobile communication service provided by the mobile communication network.

As a preferred embodiment, in an embodiment of the present invention, before the authentication server obtains the first authentication information sent by the terminal, the authentication method of the terminal can also include: the authentication server sends a authentication request including a random number to the terminal, The terminal can be used to obtain the first certification information inputted by the user and determine the first authentication information according to the first certification information and the random number.

The detailed description of the authentication process of the first terminal and the second terminal is the same as the above method, which will not be repeated here.

As a preferred embodiment, in an embodiment of the present invention, the authentication server authenticates the user terminal except through the above-mentioned certification information (that is, the first certification information), and can also authenticate the user terminal through another certification information (such as a second certification information) combining with the first certification information. For example, before being authenticated according to the first certification information, the terminal can be preliminarily authenticated through the second certification information. Specifically, the terminal can be used to obtain the second certification information, and determine the second authentication information according to the second certification information, and send the second authentication information to the authentication server, thus, before the above-mentioned step S202 'the authentication server obtains the first authentication information sent by the terminal', the following steps can be executed:

S90, the authentication server obtains the second authentication information sent by the terminal. The terminal can be used to obtain the second certification information through the subscriber identity module SIM connected with the terminal; and/or the terminal can obtain the second certification information through the storage module embedded inside.

S92, the authentication server authenticates the terminal according to second authentication information.

S94, after the authentication server has successfully authenticated the terminal according to the second authentication information, the authentication server authorizes the terminal to access the mobile communication network so as to obtain the third type of mobile communication service.

S96, after the authentication server has successfully authenticated the terminal according to the first authentication information, the authentication server authorizes the terminal to access the mobile communication network so as to obtain the fourth type of mobile communication service.

Figure 10:
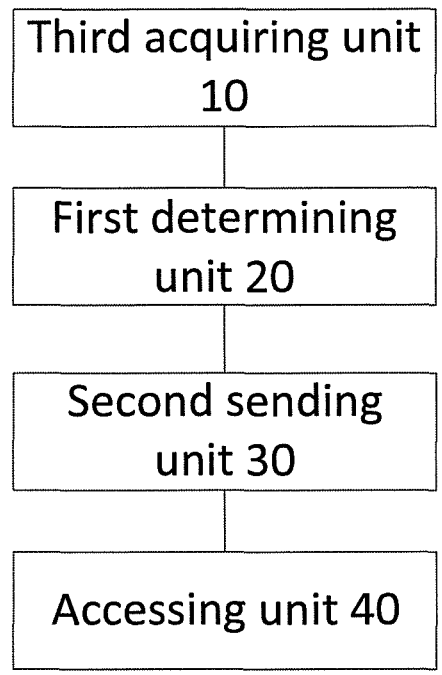
FIG. 10 is a schematic diagram of an apparatus for authenticating a terminal in a mobile communication system according to an embodiment of the present invention.

The above-mentioned authentication method is a two-stage authentication method: the terminal pre-stores the second certification information of the user, and obtains the first certification information inputted by the user, the first certification information can be used to authenticate the user in a software developed by a third-party except the user and the mobile communication service provider; when the terminal enters an area covered by the mobile communication network, firstly the terminal automatically communicates with the mobile communication network and is authenticated according to the second certification information, and then communicates with the mobile communication network and is authenticated according to the first certification information; if the terminal is successfully authenticated according to the second certification information, then obtains the third type of mobile communication service through the mobile communication network; if the terminal is successfully authenticated according to the first certification information, then further obtains the fourth type of mobile communication service through the mobile network. The whole process is shown in FIG. 10.

The source of the second certification information is as mentioned, which will not be repeated here. The second certification information includes at least one of the followings: international mobile subscriber identification number (International Mobile Subscriber Identification Number, the Ki, security algorithm (such as A3, A8 algorithm), other key information (such as the Kc information derived from the Ki), location area identity (Location Area Identity, LAI), temporary mobile subscriber identity (Temporary Mobile Subscriber Identity, TMSI), public telephone network code access-barred, personal identification number (Personal Identification Number, PIN), the PIN unlocking key (PIN Unlocking Key, PUK), charge rate, user telephone number information.

In the present invention, the authentication based on the first certification information and the authentication based on the second certification information similar to the information included by a traditional SIM can be dual authentication, that is, the mobile communication network can authenticate the terminal through this process, provide the communication service to the terminal after successful authentication; the terminal also can authenticate the network through this process, and send user information to the mobile communication network after successful authentication. The dual authentication mechanism builds a higher confidence between the two communication opposite ends, i.e., between the terminal and the network, so as to improve the security of the communication.

As a preferred embodiment, in an embodiment of the present invention, the terminal can be authorized to access the mobile communication network so as to obtain the third type of mobile communication through the LIPA protocol by the mobile communication network. The terminal can be authorized to access the mobile communication network so as to obtain the fourth type of mobile communication through the SIPTO protocol by the mobile communication network. The detailed description of the content is the same as the above-mentioned method, which will not be repeated here.

As a preferred embodiment, the present invention uses unlicensed frequency band to provide the mobile communication service. The current wireless communication includes the wireless communication on licensed frequency band and unlicensed frequency band, the frequency band occupied by the wireless communication on the licensed frequency band such as the communication provided by the current mobile communication operator, is used by a specific mobile communication operator individually; however, the wireless communication on the Unlicensed frequency band such as the current wife, which can be used freely. Since the Unlicensed frequency is open, when authenticating through a software server, the mobile communication network can provide mobile communication business through the Unlicensed frequency band, the frequency spectrum and the authentication process are both well opened, which is advantage for the openness of the communication service platform and service innovation.

An apparatus for authenticating a terminal in a mobile communication system is provided according to an embodiment of the present invention, the apparatus for authenticating a terminal in a mobile communication system is used to authenticate identity of the terminal in the mobile communication system according to the authentication information of the target software. It should be noted that, the method for authenticating a terminal used in the mobile communication system provided by the embodiments of the present invention can be executed through the apparatus for authenticating a terminal in the mobile communication system of the embodiments of the present invention, the apparatus for authenticating a terminal used in a mobile communication system of the embodiments of the present invention can also be used to execute the method for authenticating a terminal in a mobile communication system of the embodiments of the present invention.

As shown in FIG. 10, the apparatus includes: a third obtaining unit 10, a first determining unit 20, a second sending unit 30 and an accessing unit 40.

The third obtaining unit 10 is provided so that the terminal can obtain the first certification information inputted by the user, the first certification information is the information successfully certified by the target software.

The first determining unit 20 is provided so that the terminal can determine first authentication information according to first certification information.

The second sending unit 30 is provided so that the terminal can send the first authentication information to the authentication server, the authentication server is configured to authenticate the terminal according to the first authentication information.

The accessing unit 40 is provided so that, after the authentication server has successfully authenticated the terminal according to first authentication information, the terminal can access a mobile communication network.

Specifically, when entering an area covered by the mobile communication network, the terminal can automatically communicate with the mobile communication network and authenticate the identity of the terminal according to first certification information. After authentication, the authentication server can send the authentication result to the mobile communication network. If the authentication is succeeded, the terminal can access the mobile communication network, and obtain the mobile communication service; if the authentication is failed, the terminal cannot access the mobile communication network, and also cannot obtain the mobile communication service. Before the terminal sends the first authentication information to the authentication server, the mobile communication network can send an authenticating information request to the terminal, after receiving the authenticating information request, the terminal will send first authentication information to the authentication server according to the authenticating information request. The detailed description of the content is the same as the above-mentioned method, which will not be repeated here.

As a preferred embodiment, in an embodiment of the present invention, the terminal can include one or more terminals, for example, the terminal can include a first terminal and a second terminal, thus, when the user inputs the same certification information on the first terminal and the second terminal respectively, for example, after the second terminal has been successfully authenticated according to the certification information, if the first terminal is also successfully authenticated according to the same certification information, then the first terminal and the second terminal can be authenticated through Manner One or Manner Two:

Manner One:

The third obtaining unit 10 is further configured so that the first terminal can obtain the first certification information inputted by a user.

The first determining unit 20 is also further configured so that the terminal can determine first authentication information according to first certification information, which includes: the first terminal determines the first authentication information according to the first certification information.

The second sending unit 30 is further configured so that the terminal can send the first authentication information to the authentication server, which includes: the first terminal sends the first authentication information to the authentication server.

The apparatus for authenticating a terminal also can include: a first receiving unit, a fourth authenticating unit, a third judging unit and a second disconnecting unit.

The first receiving unit is provided so that, after the first terminal sends the first authentication information to the authentication server, the authentication server can receive the first authentication information sent by the first terminal. The fourth authenticating unit is provided so that the authentication server can authenticate the first terminal according to the first authentication information sent by the first terminal. The third judging unit is provided so that the authentication server can judge whether the authentication to the second terminal according to the first authentication information sent by the first terminal is succeeded. The second disconnecting unit is provided so that if the authentication server has judged that the authentication on the second terminal according to the first authentication information sent by the first terminal is succeeded, the mobile communication network can disconnect the connection between the second terminal and the mobile communication network. The accessing unit is provided so that after the authentication server has successful authenticated the first terminal according to the first certification information sent by the first terminal, the first terminal can access the mobile communication network.

In Manner One, after the first terminal is authenticated successfully by the mobile communication network, the second terminal will not keep communicating with the mobile communication network. That is, if the second terminal is successfully authenticated in the mobile communication network through certain certification information firstly, subsequently, the mobile communication network detects the certification information is being used to authenticate the first terminal, then after the first terminal is successfully authenticated, the mobile communication will authorize the first terminal to communicate with the mobile communication network, and disconnect the communication between the second terminal and the mobile communication network. The detailed description of the content is the same as the above-mentioned method, which will not be repeated here.

As a preferred embodiment, based on Manner One, the apparatus for authenticating a terminal can include: a fourth judging unit.

The fourth judging unit is provided so that, before the second terminal disconnects the connection with the mobile communication network, the authentication server can judge whether the network access priority of the first terminal is higher than the network access priority of the second terminal, the second disconnecting unit is also provided so that if the authentication server judges that the network access priority of the first terminal is higher than the network access priority of the second terminal, then the second terminal disconnects the connection with the mobile communication network; and the fourth authenticating unit is also provided so that if the authentication server judges that the network access priority of the first terminal is not higher than the network access priority of the second terminal, then the authentication server does not authenticate the first terminal according to the disconnection instruction sent by the second terminal. The priority can be judged according to: the mobile communication network can send a respond request to the first terminal and the second terminal, and authorize the higher priority to the terminal responding at first.

Manner Two:

The apparatus for authenticating a terminal also can include: a fourth obtaining unit, a second determining unit, a third sending unit, a second receiving unit, a fifth authenticating unit, a fifth judging unit, a keeping unit, an accessing unit, a fifth obtaining unit and a sixth obtaining unit. The fourth obtaining unit is also provided so that the terminal can obtain the first certification information inputted by a user; the second determining unit is provided so that the first terminal can determine first authentication information according to first certification information; the third sending unit is also provided so that the first terminal can send the first authentication information to the authentication server; the second receiving unit is provided so that the authentication server can receive the first authentication information sent by the first terminal; the fifth authenticating unit is provided so that the authentication server can authenticate the first terminal according to the first authentication information sent by the first terminal; the fifth judging unit is provided so that the authentication server can judge whether the authentication to the second terminal according to the first authentication information sent by the first terminal is succeeded; the keeping unit is provided so that if the authentication server judges that the authentication on the second terminal according to the first authentication information sent by the first terminal is succeeded, the second terminal can keep the connection with the mobile communication network; the accessing unit is provided so that after the authentication server has successfully authenticated the first terminal according to the first certification information sent by the first terminal, the first terminal can access the mobile communication network; the fifth obtaining unit is also provided so that the first terminal can obtain a first type of mobile communication service provided by the mobile communication network; and the sixth obtaining unit is also provided so that the second terminal can obtain a second type of mobile communication service provided by the mobile communication network.

In Manner Two, the first terminal and the second terminal can keep communicating with the mobile communication network at the same time. It should be noted that, in Manner Two, the mobile communication network can send a message to the both terminals to prompt that another terminal is using the same certification information for authentication at the same time. The detailed description of the content is the same as the above-mentioned method, which will not be repeated here.

As a preferred embodiment, in an embodiment of the present invention, the terminal can determine the first authentication information according to the first certification information through various manners.

Example 3

The first determining unit 20 can include: a determining module and a generating module. The determining module is provided so that the terminal can determine identification data according to first certification information; and the generating module is provided so that the terminal can generate the first authentication information according to the identification data. Specifically, the terminal side can include an apparatus for generating identification data, the apparatus for generating identification data is configured to generate the corresponding identification data according to the first certification information inputted by the user, the identification data is used to generate the authentication information through an apparatus for generating authentication information of terminal. The detailed description of the content is the same as the above-mentioned method, which will not be repeated here.

Example 4

As a preferred embodiment, in an embodiment of the present invention, the apparatus for authenticating a terminal can also include: a third receiving unit. The third receiving unit is provided so that before the terminal obtains the first authentication information, the terminal can receive the authentication request including a random number sent by the authentication server, the first determining unit is also provided so that the terminal can determine the first authentication information according to the first certification information and the random number.

For security of network transmission, the authentication information request sent to the terminal by a mobile communication network can include a random number, the terminal can determine the authentication information according to the random number and the first certification information inputted by a user and using the first authentication function, and send the authentication information to the mobile communication network, as shown in FIG. 5, the first authentication function is achieved in the apparatus for generating authentication information of terminal. The mobile communication network side has the information of random number and the first authentication function, and then receives authentication information of a terminal, hereby can authenticate the terminal accordingly. Thus, even though the authentication information sent by a terminal is intercepted by someone else, since the interceptor does not know the random number which is only used to authenticate for this time, so he cannot obtain the certification information inputted by a user reversely, which guarantees the security of the certification information.

As a preferred embodiment, in an embodiment of the present invention, except for the above-mentioned certification information (that is, the first certification information) which is used to authenticate the user's terminal, the user's terminal can be authenticated through another certification information (such as a second certification information) combining with the first certification information. For example, before being authenticated according to the first certification information, the terminal can be preliminarily authenticated through the second certification information. Specifically, the apparatus for authentication also can include: a seventh obtaining unit, an eighth obtaining unit, a third determining unit and a third sending unit.

The seventh obtaining unit is provided so that before the terminal obtains the first certification information inputted by a user, the terminal can obtain the second certification information through a subscriber identity module SIM connected with the terminal; and/or the eight obtaining unit is also provided so that the terminal can obtain the second certification information through a storage module embedded therein; the third determining unit is provided so that the terminal can determine second authentication information according to second certification information; the fourth sending unit is provided so that the terminal will send the second authentication information to the authentication server, the authentication server is configured to authenticate the terminal according to second authentication information, the accessing unit is provided so that after the authentication server has successfully authenticated the terminal according to the second authentication information, the terminal can access a mobile communication network so as to obtain a third type of mobile communication service; and after the authentication server has successfully authenticated the terminal according to the first authentication information, the terminal can access a mobile communication network so as to obtain a fourth type of mobile communication service.

As a preferred embodiment, in an embodiment of the present invention, the accessing unit is also provided so that the terminal can access the mobile communication network through the LIPA protocol to obtain a third type of mobile communication service; and the terminal can access the mobile communication network to obtain the fourth type of mobile communication through the SIPTO protocol. The detailed description of the content of the LIPA protocol and the SIPTO protocol is the same as the above-mentioned method, which will not be repeated here.

As a preferred embodiment, in the embodiment of the present invention, the apparatus for authenticating a terminal can also include: a first generating unit and a second generating unit.

The first generating unit is provided so that after the terminal has accessed a mobile communication network so as to obtain the third type of mobile communication service, the terminal can generate first reminding information, the second generating unit is provided so that after the terminal has accessed a mobile communication network so as to obtain the fourth type of mobile communication service, the terminal can generate a second reminding information.

The second certification information can be SIM card information, when the terminal is authenticated successfully according to the SIM card information, the terminal sends the first reminding information; when being successfully authenticated according to the first certification information, the terminal sends the second reminding information, so that the user obtains the current available mobile communication service type. The detailed description of the content is the same as the above-mentioned method, which will not be repeated here.

According to an embodiment of the present invention, another apparatus of terminal authentication used in mobile communications system is provided.

Figure 11:
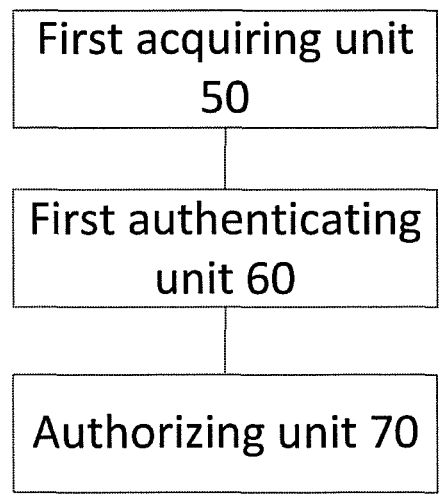
FIG. 11 is a schematic diagram of another apparatus for authenticating a terminal in a mobile communication system according to an embodiment of the present invention.

As shown in FIG. 11, the apparatus includes: a first obtaining unit 50, a first authenticating unit 60, and an authorizing unit 70.

The first obtaining unit 50 is provided so that the authentication server can obtain the first authentication information sent by the terminal, the terminal can be used to obtain the first certification information inputted by the user, and determine the first authentication information according to the first certification information, the first certification information is the information successfully certified by the target software, the first authenticating unit 60 is also provided so that the authentication server can authenticate the terminal according to the first authentication information, and the authorizing unit 70 is provided so that, after the authentication server has successfully authenticated the terminal according to first authentication information, the mobile communication network authorizes the terminal to access the mobile communication network.

The authentication server receives the first authentication information according to the first certification information inputted by the user, and authenticates the terminal according to the first authentication information, if the authentication is succeeded, the mobile communication network will provide mobile communication service to the terminal. First certification information can be used to authenticate the user in a software (target software) developed by a third-party except the user and the mobile communication service provider. The detailed description of the content is the same as the above-mentioned method, which will not be repeated here.

As a preferred embodiment, in an embodiment of the present invention, the authentication server can be the subscriber authentication center in the mobile communication network, or can be a mobile communication server (such as AAA server) in the mobile communication network, or can be a cloud platform having the functions of the authentication server in the mobile communication network. Or the authentication server can also be a software server corresponding to the target software developed by a third-party. The subscriber authentication center, the mobile communication server and the software server can authenticate a terminal through the following manners: the authentication server can include an subscriber authentication center of the mobile communication network, the first authenticating unit 60 can include: a first obtaining module, a first receiving module and a first authenticating module.

The subscriber authentication center: the first obtaining module is provided so that the subscriber authentication center can obtain user data used for a target software to certify the first certification information; the first receiving module is provided so that the subscriber authentication center can receive the first authentication information sent by the terminal; the first authenticating module is provided so that the subscriber authentication center can authenticate the terminal according to the user data and first authentication information, the authorizing unit is provided so that after the subscriber authentication center has successfully authenticated the terminal according to first authentication information and the user data, the authentication server authenticates the terminal to access the mobile communication network. The detailed description thereof is the same as the above-mentioned method, which will not be repeated here.

The mobile communication server: the authentication manner of the mobile communication server is similar to the subscriber authentication center, which will not be repeated here. The detailed description of the content is the same as the above-mentioned method, which will not be repeated here either.

Or, the authentication server can include a software server corresponding to the target software, the third authenticating unit can include: a second obtaining module and a second authenticating module. The second obtaining module is provided so that the software server can obtain the first authentication information sent by the first terminal; the second authenticating module is provided so that the software server can authenticate the terminal according to the first authentication information; and the authorizing unit is provided so that, after the software server has successfully authenticated the terminal according to first authentication information, the mobile communication network can authorize the terminal to access the mobile communication network.

When the authentication on the terminal is completed on a third-party software server, the third-party software server sends the authentication result to the mobile communication network, the mobile communication network provides the mobile communication service to the terminal according to the authentication result. The detailed description of the content is the same as the above-mentioned method, which will not be repeated here.

As a preferred embodiment, in an embodiment of the present invention, the terminal can include multiple terminals, for example, the terminal can include a first terminal and a second terminal, thus, the authentication server can authenticate the first terminal and the second terminal through Manner One or Manner Two.

In Manner One, the first obtaining unit 50 is also provided so that the authentication server can obtain the first authentication information sent by the first terminal, the apparatus for authenticating a terminal also can include: a second authenticating unit, a first judging unit and a first disconnecting unit.

The second authenticating unit is provided so that after the authentication server has obtained the first authentication information sent by the first terminal, the authentication server can authenticate the first terminal according to the first authentication information sent by the first terminal; the first judging unit is provided so that the authentication server can judge whether the authentication to the second terminal according to the first authentication information sent by the first terminal is succeeded; the first disconnecting unit is provided so that if the authentication server judges that the authentication on the second terminal according to the first authentication information sent by the first terminal is succeeded, the second terminal can disconnect the connection with mobile communication network, the authorizing unit is provided so that after the authentication server has successfully authenticated the first terminal according to the first certification information sent by the first terminal, the authentication server authorizes the first terminal to access the mobile communication network.

As a preferred embodiment, the apparatus for authenticating also can include: a second judging unit. The fifth judging unit is provided so that before the second terminal disconnects the connection with the mobile communication network, the authentication server can judge whether the network access priority of the first terminal is higher than the network access priority of the second terminal, the first disconnecting unit is also provided so that if the authentication server judges that the network access priority of the first terminal is higher than the network access priority of the second terminal, then the second terminal disconnects the connection with the mobile communication network; and the first authenticating unit is also provided so that if the authentication server judges that the network access priority of the first terminal is not higher than the network access priority of the second terminal, then the authentication server does not authenticate the first terminal according to the first certification information sent by the first terminal.

In Manner Two, the authenticating unit can include: a second receiving module, a second authenticating module, a judging module, a keeping module and an authorizing module.

The second receiving module is provided so that the authentication server can receive the first authentication information sent by the first terminal; the second authenticating module is provided so that the authentication server can authenticate the first terminal according to the first authentication information sent by the first terminal; the judging module is provided so that the authentication server can judge whether the second terminal has been successfully authenticated according to the first authentication information sent by the first terminal; the keeping module is provided that if the authentication server judges that the second terminal has been successfully authenticated according to the first authentication information sent by the first terminal, then the second terminal can keep the connection with the mobile communication network; the authenticating module is provided so that after the authentication server has successfully authenticated the first terminal according to first authentication information sent by the first terminal, the mobile communication network can authorize the first terminal to access the mobile communication network; the first terminal can be used to obtain a first type of mobile communication service provided by the mobile communication network; and the second terminal can be used to obtain a second type of mobile communication service provided by the mobile communication network.

As a preferred embodiment, in an embodiment of the present invention, the apparatus for authenticating a terminal also can include: a first sending unit. The first sending unit is provided so that before the authentication server has obtained the first authentication information sent by the terminal, the authentication server can send a authentication request including a random number to the terminal, the terminal can be used to obtain the first certification information inputted by the user and determine the first authentication information according to the first certification information and the random number. The detailed description of the authentication process of the first terminal and the second terminal is the same as the above method, which will not be repeated here.

As a preferred embodiment, in an embodiment of the present invention, except the above-mentioned certification information (that is, the first certification information) used to authenticate the user's terminal, the user's terminal also can be authenticated through another certification information (such as a second certification information) combining with the first certification information. For example, before being authenticated according to the first certification information, the terminal can be preliminarily authenticated through the second certification information. Specifically, the terminal can be used to obtain the second certification information, and determine the second authentication information according to the second certification information, and send the second certification information to the authentication server, the apparatus for authenticating can also include: a second obtaining unit and a third authenticating unit.

The second obtaining unit is provided so that before the authentication server has obtained the first authentication information sent by the terminal, the authentication server can obtain the second authentication information sent by the terminal. The terminal is used to obtain the second certification information through the subscriber identity module SIM connected with the terminal and/or obtain the second certification information through the storage module embedded therein; the third authenticating unit is also provided so that the authentication server can authenticate the terminal according to the second authentication information, the authorizing unit is provided so that after the authentication server has successfully authenticated the terminal according to the second authentication information, the mobile communication network authorizes the terminal to access a mobile communication network so as to obtain the third type of mobile communication service; and after the authentication server has successfully authenticated the terminal according to the first authentication information, the mobile communication network authorizes the terminal to access the mobile communication network so as to obtain the fourth type of mobile communication service. The authorizing unit is also provided so that the mobile communication network can authorize the terminal to access the mobile communication network to obtain the third type of mobile communication through the LIPA protocol; and the mobile communication network can authorize the terminal to access the mobile communication network to obtain the fourth type of mobile communication through the SIPTO protocol.

The above-mentioned authentication manner is two-stage authentication manner: the terminal pre-stores the second certification information of the user, and obtains the first certification information inputted by the user, the first certification information can be used to authenticate the user in software developed by a third-party except the user and the mobile communication service provider; when the terminal enters into the area covered by the mobile communication network, the terminal will firstly communicate with the mobile communication network automatically and be authenticated according to the second certification information, and then communicate with the mobile communication network and be authenticated according to the first certification information; if the authentication according to the second certification information is succeeded, then the third type of mobile communication service is obtained through the mobile communication network; if the authentication according to the first certification information is succeeded, and then the fourth type of mobile communication service is obtained through the mobile network further. The detailed description of the content is the same as the above-mentioned method, which will not be repeated here.

As a preferred embodiment, in an embodiment of the present invention, the terminal can be authorized by the mobile communication network to access the mobile communication network so as to obtain the third type of mobile communication through the LIPA protocol. The terminal can be authorized by the mobile communication network to access the mobile communication network so as to obtain the fourth type of mobile communication through the SIPTO protocol. The detailed description thereof is the same as the above-mentioned method, which will not be repeated here.

Through the above-mentioned description, the embodiment of the present invention can achieve the following technical effect:

It is unnecessary for a user to buy a SIM card from a mobile communication service provider, instead, directly inputting certification information in the terminal; when the terminal enters into an area covered by the mobile communication network, the terminal will automatically communicate with the mobile communication network and be authenticated according to the certification information, if the authentication is succeeded, the terminal can enjoy the mobile communication service. Therefore, it is unnecessary to provide a SIM card slot in the terminal, so as to reduce design complexity of the terminal, which is also advantage for the development of the terminal to be higher and thinner. Furthermore, when in use, the certification information is only needed to be inputted in the terminal once, thus, the terminal can be automatically authenticated when entering into different areas covered by the mobile communication network.

The certification information inputted by the user can be used not only in the authenticating operation during the process of entering the mobile communication network, but also to authenticate a user in a software developed by a third-party, which avoids the problem that a user needs to own multiple network identities, for example, a Wechat user can input Wechat ID and password in the terminal, and when the terminal enters into an area covered by the mobile communication network, the terminal will automatically communicate with the mobile communication network and be authenticated according to the inputted certification information, so that the user only needs a network identity of Wechat ID, the user can obtain more convenient information service through the social resource of a third-party, for example, after inputting a Wechat ID and password, the user can directly connect to the Internet through the mobile communication network and communicate with friends.

Improving the value of the software developed by a third-party. For example, when a user can enjoy the mobile communication service through inputting a Wechat ID and password, the Wechat will absorb more users, so as to improve the value of the Wechat; the mobile communication service provider also can expand the service range through cooperating with a third-party, for example, gaining profit through improving the value of the third-party.

It should be noted that, the steps shown in the flow chart of the drawings can be executed in a computer system which can execute instructions such as a group of computers, and, although the flow chart shows the logical sequence, but in some situation, the shown or described steps also can be executed in a different order.

The present invention also provides a storage medium, which is used to store the programming code executed by the method for authenticating a terminal in the mobile communication system.

Obviously, those skilled in the art should understand: the above-mentioned each module and each step of the present invention can be achieve through a general computing device, these can be integrated in a single computing device, or distributed in a network constituted by multiple computing devices, as a preferred embodiment, they can be achieved by using programming code which is executable by a computing device, thereby, they can be stored in a storage device and executed by a computing device, or made into various integrated circuit modules separately, or multiple modules or steps thereof can be made into a single integrated circuit module to be achieved. Thus, the present invention will not limit any specific hardware combining with the software.

The above are just the preferred embodiments of the present invention, and will not limit the present invention, for those skilled in the art, the present invention can have various modifications and variations. Any modifications, equivalent replacements and improvements made within the spirits and principles of the present invention shall all fall in the protection scope of the present invention.

What is claimed is:

1. A method for authenticating a terminal in a mobile communication system, comprising:
    an authentication server obtains first authentication information sent by a terminal, the terminal is configured to obtain first certification information inputted by a user, and determine the first authentication information according to the first certification information, wherein, the first certification information is information certified by a target software;
    the authentication server authenticates the terminal according to the first authentication information; and
    after the authentication server has successfully authenticated the terminal according to the first authentication information, a mobile communication network authorizes the terminal to access the mobile communication network,
    wherein the terminal is configured to obtain second certification information, and determine second authentication information according to the second certification information, and send the second authentication information to the authentication server, before the authentication server has obtained first authentication information sent by the terminal, the method for authenticating further comprises:
    the authentication server obtains the second authentication information sent by the terminal, wherein, the terminal is configured to obtain the second certification information through the subscriber identity module (SIM) connected with the terminal and/or to obtain the second certification information through a storage module embedded therein;
    the authentication server authenticates the terminal according to the second authentication information,
    wherein, after the authentication server has successfully authenticated the terminal according to the second authentication information, the mobile communication network authorizes the terminal to access the mobile communication network so as to obtain a third type of mobile communication service; and after the authentication server has successfully authenticated the terminal according to the first authentication information, the mobile communication network authorizes the terminal to access the mobile communication network so as to obtain a fourth type of mobile communication service.

2. The method for authenticating a terminal according to claim 1,
    the authentication server is an subscriber authentication center of the mobile communication network, the subscriber authentication center authenticates the terminal through following manner:
    the subscriber authentication center obtains user data used for the target software to certify the first certification information;
    the subscriber authentication center receives the first authentication information sent by the terminal;
    the subscriber authentication center authenticates the terminal according to the user data and the first authentication information; and
    after the subscriber authentication center has successfully authenticated the terminal according to the first authentication information and the user data, the authentication server authenticates the terminal to access the mobile communication network,
    or,
    the authentication server is a software server of the target software, the software server authenticates the terminal through following manner:
    the software server obtains the first authentication information sent by the terminal;
    the software server authenticates the terminal according to the first authentication information; and
    after the software server has successfully authenticated the terminal according to the first authentication information, the mobile communication network authorizes the terminal to access the mobile communication network.

3. The method for authenticating a terminal according to claim 1, the terminal comprises a first terminal and a second terminal, an authentication server obtains first authentication information sent by a terminal, comprises: the authentication server obtains first authentication information sent by the first terminal, wherein, after the authentication server has successfully authenticated the terminal according to the first authentication information, a mobile communication network authorizes the terminal to access the mobile communication network, comprises:
    the authentication server authenticates the first terminal according to the first authentication information sent by the first terminal;
    the authentication server judges whether the second terminal has been successfully authenticated according to the first authentication information sent by the first terminal;
    if the authentication server judges that the second terminal has been successfully authenticated according to the first authentication information sent by the first terminal, then the second terminal disconnects a connection with the mobile communication network,
    wherein, after the authentication server has successfully authenticated the first terminal according to first authentication information sent by the first terminal, the authentication server authorizes the first terminal to access the mobile communication network.

4. The method for authenticating a terminal according to claim 3, wherein, the second terminal disconnects a connection with the mobile communication network, comprises:
    the authentication server judges whether a network access priority of the first terminal is higher than a network access priority of the second terminal,
    wherein, if the authentication server judges that the network access priority of the first terminal is higher than the network access priority of the second terminal, then the second terminal disconnects the connection with the mobile communication network; and if the authentication server judges that the network access priority of the first terminal is not higher than the network access priority of the second terminal, then the authentication server does not authenticate the first terminal according to the first certification information sent by the first terminal.

5. The method for authenticating a terminal according to claim 1, the terminal comprises a first terminal and a second terminal, the mobile communication network authorizes the second terminal to access the mobile communication network through following manner:
 the authentication server receives first authentication information sent by the first terminal;
 the authentication server authenticates the first terminal according to the first authentication information sent by the first terminal;
 the authentication server judges whether the second terminal has been successfully authenticated according to the first authentication information sent by the first terminal;
 if the authentication server judges that the second terminal has been successfully authenticated according to the first authentication information sent by the first terminal, then the second terminal keeps a connection with the mobile communication network;
 after the authentication server has successfully authenticated the first terminal according to first authentication information sent by the first terminal, the mobile communication network authorizes the first terminal to access the mobile communication network,
 wherein, the first terminal is configured to obtain a first type of mobile communication service provided by the mobile communication network; and the second terminal is configured to obtain a second type of mobile communication service provided by the mobile communication network.

6. The method for authenticating a terminal according to claim 1, before the authentication server has obtained first authentication information sent by the terminal, the method for authenticating a terminal further comprises:
 the authentication server sends an authentication request comprising a random number to the terminal,
 wherein, the terminal is configured to obtain the first certification information inputted by the user and determine the first authentication information according to the first certification information and the random number.

7. The method for authenticating a terminal according to claim 1,
 the mobile communication network authorizes the terminal to access the mobile communication network so as to obtain a third type of mobile communication service through a local internet protocol access (LIPA) protocol; and
 the mobile communication network authorizes the terminal to access the mobile communication network to obtain a fourth type of mobile communication through a selected internet protocol traffic offload (SIPTO) protocol.

8. An apparatus for authenticating a terminal in a mobile communications system, wherein, comprises:
 a first obtaining unit, configured so that an authentication server obtains first authentication information sent by a terminal, the terminal is configured to obtain first certification information inputted by a user, and determine the first authentication information according to the first certification information, wherein the first certification information is information certified by a target software;
 a first authenticating unit, configured so that the authentication server authenticates the terminal according to the first authentication information; and
 an authorizing unit, configured so that after the authentication server has successfully authenticated the terminal according to the first authentication information, a mobile communication network authorizes the terminal to access the mobile communication network,
 wherein the terminal is configured to obtain second certification information, and determine second authentication information according to the second certification information, and send the second authentication information to the authentication server, the apparatus for authenticating further comprises:
 a second obtaining unit, configured so that before the authentication server obtains the first authentication information sent by the terminal, the authentication server obtains the second authentication information sent by the terminal, wherein, the terminal is configured to obtain the second certification information through the subscriber identity module (SIM) connected with the terminal and/or to obtain the second certification information through a storage module embedded therein;
 a third authenticating unit, configured so that the authentication server authenticates the terminal according to the second authentication information,
 wherein, the authenticating unit is further configured so that after the authentication server has successfully authenticated the terminal according to the second authentication information, the terminal can be authorized to access the mobile communication network so as to obtain a third type of mobile communication service; and after the authentication server has successfully authenticated the terminal according to the first authentication information, the terminal can be authorized to access the mobile communication network so as to obtain a fourth type of mobile communication service.

9. The apparatus for authenticating a terminal according to claim 8, the authentication server comprises an subscriber authentication center in the mobile communication network, the first authenticating unit comprises:
 a first obtaining module, configured so that the subscriber authentication center obtains user data used for a target software to certify the first certification information;
 a first receiving module, configured so that the subscriber authentication center receives the first authentication information sent by the terminal;
 a first authenticating module, configured so that the subscriber authentication center authenticates the terminal according to the user data and the first authentication information,
 wherein, the authorizing unit is further configured so that after the subscriber authentication center has successfully authenticated the terminal according to the first authentication information and the user data, the authentication server authenticates the terminal to access the mobile communication network,
or,
 the authentication server comprises a software server corresponding to the target software, the first authenticating unit comprises:
 a second obtaining module, configured so that the software server obtains the first authentication information sent by the first terminal;

a second authenticating module, configured so that the software server authenticates the terminal according to the first authentication information; and wherein, the authorizing unit is further configured so that after the software server has successfully authenticated the terminal according to the first authentication information, the mobile communication network authorizes the terminal to access the mobile communication network.

10. The apparatus for authenticating a terminal according to claim 8, the terminal comprises a first terminal and a second terminal, the first obtaining unit is further configured so that the authentication server obtains the first authentication information sent by the first terminal, wherein, the apparatus for authenticating a terminal further comprises:

a second authenticating unit, configured so that after the authentication server obtains the first authentication information sent by the first terminal, the authentication server authenticates the first terminal according to the first authentication information sent by the first terminal;

a first judging unit, configured so that the authentication server judges whether the second terminal has been successfully authenticated according to the first authentication information sent by the first terminal;

a first disconnecting unit, configured so that if the authentication server judges that the second terminal has been successfully authenticated according to the first authentication information sent by the first terminal, the second terminal disconnects a connection with mobile communication network, wherein, the authorizing unit is further configured so that after the authentication server has successfully authenticated the first terminal according to the first certification information sent by the first terminal, the authentication server authorizes the first terminal to access the mobile communication network.

11. The apparatus for authenticating a terminal according to claim 10, the apparatus for authenticating a terminal further comprises:

a second judging unit, configured so that before the second terminal disconnects the connection with the mobile communication network, the authentication server judges whether a network access priority of the first terminal is higher than a network access priority of the second terminal, wherein, the first disconnecting unit is further configured so that if the authentication server judges that the network access priority of the first terminal is higher than the network access priority of the second terminal, then the second terminal disconnects the connection with the mobile communication network; and the first authenticating unit is further configured so that if the authentication server judges that the network access priority of the first terminal is not higher than the network access priority of the second terminal, then the authentication server does not authenticate the first terminal according to the first certification information sent by the first terminal.

12. The apparatus for authenticating a terminal according to claim 8, the terminal comprises a first terminal and a second terminal, the authorizing unit comprises:

a second receiving module, configured so that the authentication server receives the first authentication information sent by the first terminal;

a second authenticating module, configured so that the authentication server authenticates the first terminal according to the first authentication information sent by the first terminal;

a judging module, configured so that the authentication server judges whether the second terminal has been successfully authenticated according to the first authentication information sent by the first terminal;

a keeping module, configured so that if the authentication server judges that the second terminal has been successfully authenticated according to the first authentication information sent by the first terminal, then the second terminal keeps a connection with the mobile communication network;

an authenticating module, configured so that after the authentication server has successfully authenticated the first terminal according to first authentication information sent by the first terminal, the mobile communication network authorizes the first terminal to access the mobile communication network;

wherein, the first terminal is configured to obtain a first type of mobile communication service provided by the mobile communication network; and the second terminal is configured to obtain a second type of mobile communication service provided by the mobile communication network.

13. The apparatus for authenticating a terminal according to claim 8, the apparatus for authenticating a terminal further comprises:

a first sending unit, configured so that before the authentication server obtains the first authentication information sent by the terminal, the authentication server sends an authentication request comprising a random number to the terminal, wherein, the terminal is configured to obtain first certification information inputted by the user, and determine the first authentication information according to the first certification information and the random number.

14. The apparatus for authenticating a terminal according to claim 8, the authenticating unit is further configured so that the terminal is authorized to access the mobile communication network so as to obtain a third type of mobile communication service through a local internet protocol access (LIPA) protocol by the mobile communication network; and the terminal is authorized to access the mobile communication network to obtain a fourth type of mobile communication through a selected internet protocol traffic offload (SIPTO) protocol by the mobile communication network.

* * * * *